United States Patent [19]

Bacus et al.

[11] Patent Number: 5,177,508
[45] Date of Patent: Jan. 5, 1993

[54] ELECTROPHOTOGRAPHIC PRINTER WITH PRINT JUSTIFICATION CONTROL

[75] Inventors: Michael W. Bacus, Spokane; Joseph J. Pfeuffer, Veradale; Dick T. Price, Spokane, all of Wash.

[73] Assignee: Output Technology Corporation, Spokane, Wash.

[21] Appl. No.: 770,668

[22] Filed: Oct. 1, 1991

[51] Int. Cl.⁵ .................. G01D 15/14; G01D 9/24; G03G 21/00
[52] U.S. Cl. .................. 346/160; 346/108; 355/317
[58] Field of Search ............ 346/108, 160; 355/316, 355/317

[56] References Cited

U.S. PATENT DOCUMENTS

| | | |
|---|---|---|
| 4,761,662 | 8/1988 | Yoshimoto et al. ............ 346/160 X |
| 4,843,429 | 6/1989 | Avritt et al. |
| 4,870,434 | 9/1989 | Negishi et al. ............ 346/160 |
| 4,897,675 | 1/1990 | Negishi et al. ............ 346/160 |
| 4,912,490 | 3/1990 | Negoro et al. ............ 346/160 |
| 4,949,104 | 8/1990 | Negoro et al. ............ 355/316 X |
| 5,019,872 | 5/1991 | Zajac, Jr. |

Primary Examiner—George H. Miller, Jr.
Attorney, Agent, or Firm—Wells, St. John, roberts, Gregory & Matkin

[57] ABSTRACT

An electrophotographic printer 10 is described having a print justification control for controlling the justification of the print should the linear speed of the print media 12 passing through the printer 10 be out of synchronization with the rotation of the photo conductive drum 40. The printer has a scan sensor 82 for scanning each scan line. A processor 90 compares the number of actual scan lines to a desired number of scan lines for each print media segment. A print moving sensor is provided to generate a signal for each movement of a print segment of the media. A comparison is made by the processor 90 to determine the number of actual image information scan lines placed in each media segment and for duplicating scan lines should the number of actual scan lines exceed a preset number. If the linear speed of the print media is greater than the circumferential speed of the electro conductive drum, then a processor 90 deletes scan lines.

The printer 10 includes a print control system 86 that has an all-white scan line sensor circuit 112 that senses the presence of an all-white image information scan line. This information is provided to the processor 90 to duplicate such an all-white scan line if an out-of-phase condition occurs. If an all-white scan line cannot be found, then the processor 90 selects a particular scan line location for duplication or for deletion or proceeds through a random selection algorithm for selecting such lines for duplication or deletion.

9 Claims, 3 Drawing Sheets

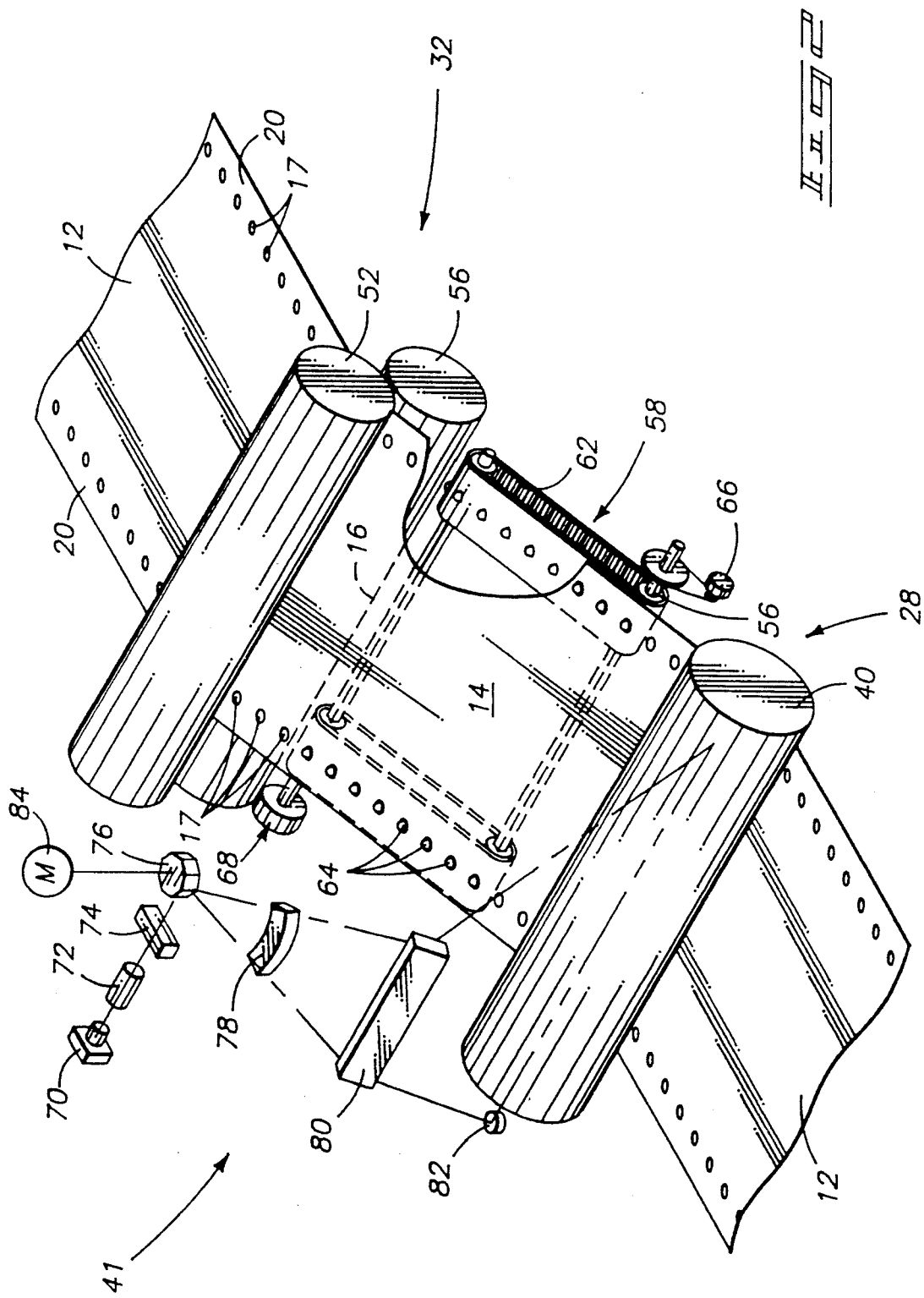

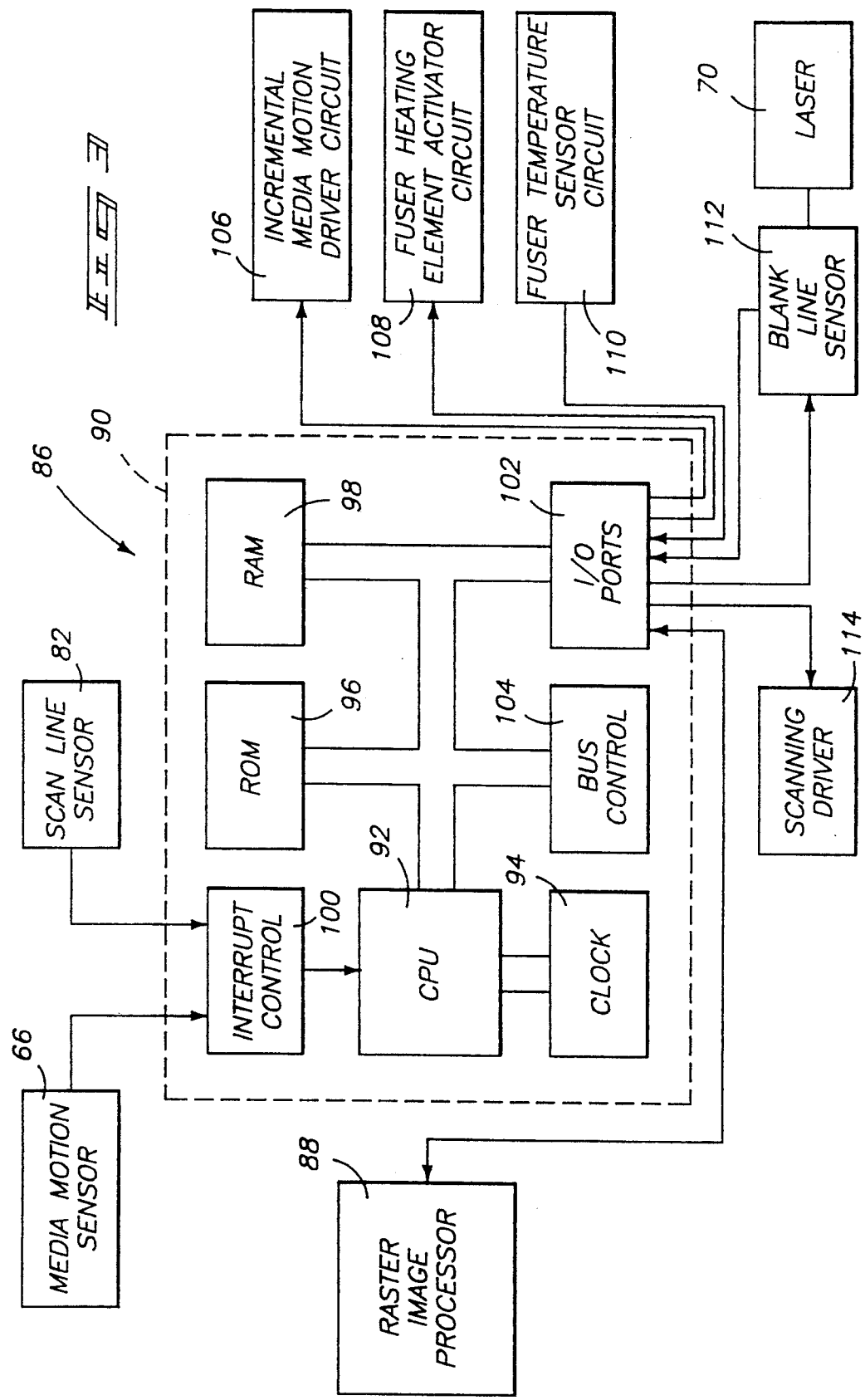

ELECTROPHOTOGRAPHIC PRINTER WITH PRINT JUSTIFICATION CONTROL

TECHNICAL FIELD

This invention relates to electrophotographic printers and more particularly with such printers have a print justification control system.

BACKGROUND OF THE INVENTION

In an electrophotographic printer, a photo-conductive drum or surface is exposed to illumination, generally by laser, to form a latent image on the drum surface. Toner is then applied to the latent image to develop the image. The developed image is transferred onto a print media and moved to a fixing device where the transferred image is fixed rather permanently to the media. For electrophotographic systems that print on rather uniform print media, it is relatively easy to maintain synchronization between the photo-conductive drum and the print media to place the image with precision on the desired area of the media.

However, when an electrophotographic printer is called upon to handle kinds of print media, having different thicknesses or made of different compositions, it is not unusual for the photoelectric drum to lose synchronization slightly with the movement of the print media. Additionally, the print media can have a different humidity; there may be variations in the diameter of the fixing rolls, there may be changes in the thickness of the media at the fixing rolls; all causing the print media to move out of phase with the associated area of the circumferential peripheral surface of the photo-conductive drum.

Such a problem becomes exceedingly serious with respect to processing of continuous form print media in which the misregistration or justification errors are accumulated along the length of the continuous form.

This problem has been recognized, and one proposed solution is the subject of the Negishi et al. U.S. Pat. No. 4,870,434 granted Sep. 26, 1989.

The Negishi et al. patent describes a possible solution in which the speed of the print media is monitored to determine the lapse time of media movement and to determine the number of scan lines placed upon the photoelectric conductor drum during the elapsed time required to move a selected segment of the print media. If the desired number of scan lines are not placed on the photo conductive drum during the elapsed time, then the scanning is interrupted or delayed to accommodate for the variance. In the specific implementation, the delay is caused to occur between the third and fourth line of textual material to increase or decrease the white line spacing therebetween. Such a system requires a complex delay circuit system for delaying the image information scan lines.

One of the objectives of this invention is to provide an improved solution for overcoming such variances which are more adaptable to a wide variety of different kinds of print media having different widths, having different compositions and having varying thicknesses. These and other objects and advantages will become apparent upon reading the following detailed description of a preferred embodiment.

BRIEF DESCRIPTION OF THE DRAWINGS

A preferred embodiment of this invention is described below with reference to the accompanying drawings, which are briefly described as follows:

FIG. 2 is a schematic perspective view showing principal parts of the electrophotographic printer, particularly the optical scanning system;

FIG. 3 is a functional block diagram of the control system for the electrophotographic printer.

DETAILED DESCRIPTION OF A PREFERRED EMBODIMENT

This disclosure of the invention is submitted in furtherance of the constitutional purposes of the U.S. Patent Laws "to promote the progress of science and useful arts" (Article 1, Section 8).

Figure 1:
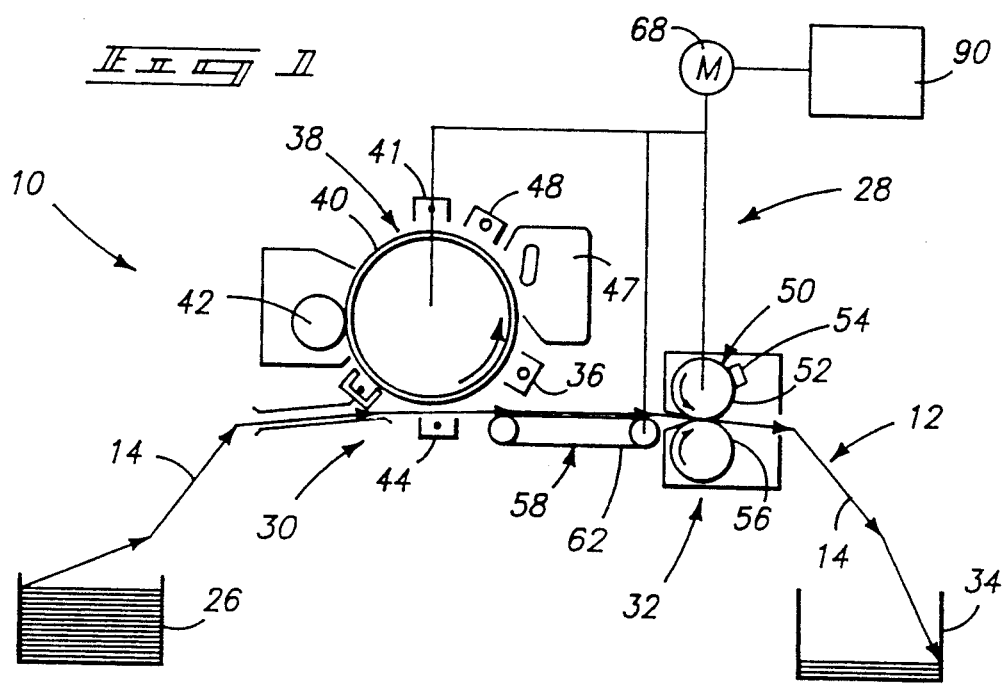
FIG. 1 is a diagrammatical side view of a preferred embodiment of the electrophotographic printer.

Referring in detail to the drawings, there is illustrated in FIG. 1 an electrophotographic printer generally designated with the numeral 10 for printing images on a print media or print stock 12. In a preferred embodiment, the print media is a continuous form media either of the "fan-fold" type illustrated in FIG. 1 or a continuous media initially formed in a roll. The print media may be of almost any type of sheet or web product on which an electrophotographic image may be placed. The media may be of standard "fan-folded" continuous form computer paper or it may be a continuous roll of label material having labels positioned at various locations on a backing sheet material. The material may be of varying widths and of various thicknesses. Because of the wide variety of materials and thicknesses, it is difficult to maintain the movement of the print media in synchronization and image registration (justification).

Figure 4:
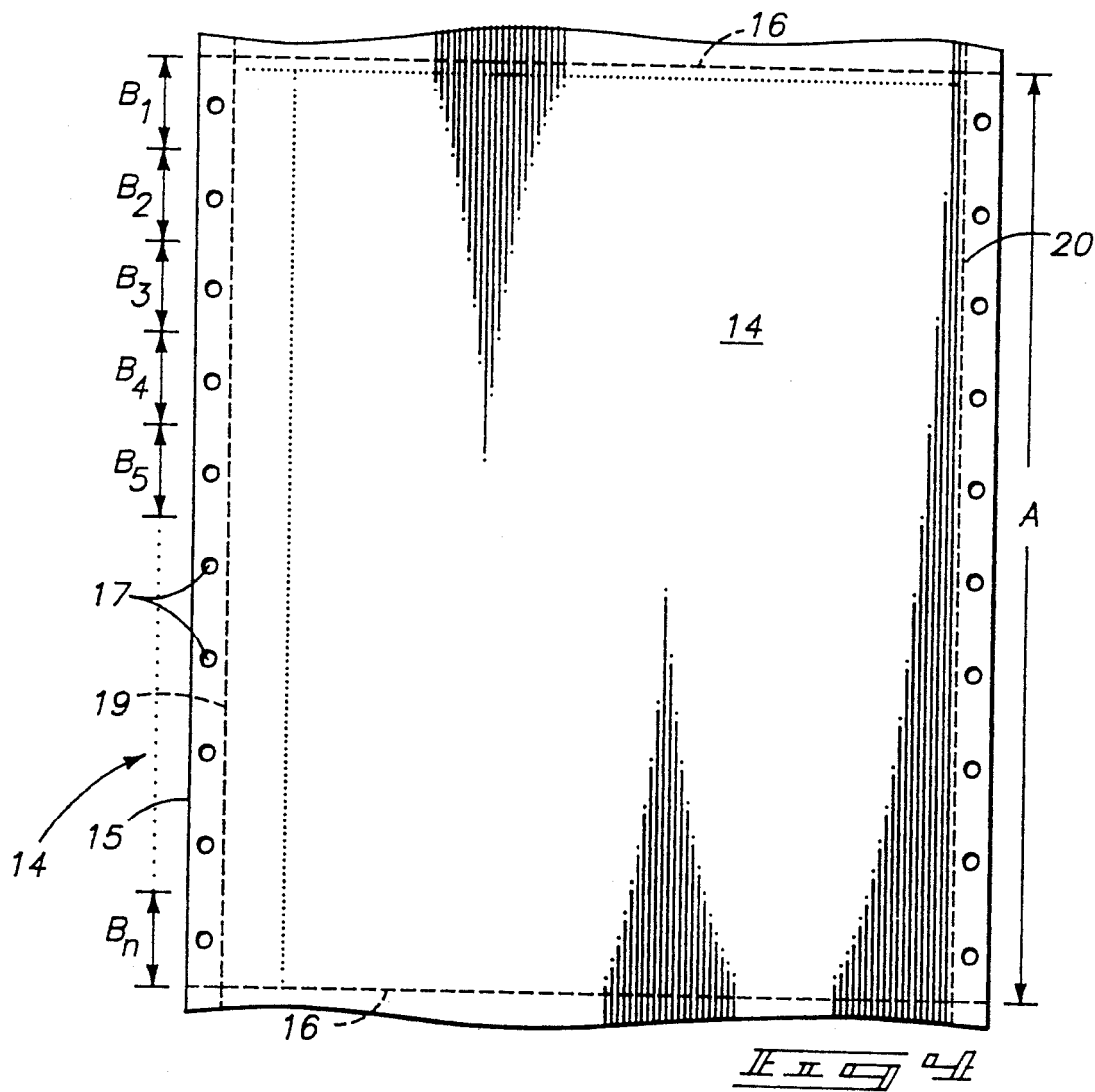
FIG. 4 is a fragmentary schematic plan view of a section of a continuous form of a print media that is utilized for illustrative purposes.

As mentioned, the preferred embodiment is a continuous form "fan-folded" print media having interconnected sheets or panels 14 in which each panel has a dimension "A" illustrated in FIG. 4. Each sheet or panel 14 has an inter-sheet boundary 16 usually indicated with transverse perforations. Each sheet or panel 14 is subdivided for purposes of this invention into a plurality of adjacent segments $B_1-B_{11}$ that extend between one inter-sheet boundary 16 to the next inter-sheet boundary. The segments for purposes of this explanation are chosen to have one-half inch lengths intervals. In an eleven inch sheet, there are twenty-two segments "$B_1-B_{22}$". The preferred computer paper has side sections or side boundaries 20 with feed or alignment apertures 17 formed therein for initially feeding the print media into the printer 10 and for maintaining general alignment.

The print media 12 is initially stored in an unprinted print media storage 26 and then is passed through the printer that places images on each of the sheets or panels 14. The print media 12 is moved through the printer by a media moving means generally designated with the numeral 28 past an image transfer station 30 in which a toner image is placed upon each of the sheets 14. The print media is continuously incrementally moved forward from the image transfer station 30 past an image fixing station 32 where it is finally stored in a post printing media storage 34.

In some situations, the print media passes into a downstream station that separates, collates and binds the print material into some type of document.

An image formation and transfer assembly 38 is positioned at the image transfer station 30 for formulating a latent image on an optical photo-conductive drum 40 and for transferring such image to the print media. The photo-conductive drum 40 has a peripheral surface with photo receptors that are selectively activated by an optical system such as a scanning laser or LED raster system.

In the preferred embodiment, the photo receptors have a resolution of 300 dots or pels per circumferential inch. Consequently for an 11 inch sheet, 3300 dots or pels per inch are formed in the longitudinal direction (direction of movement of the print media). If the movement of the print media with respect to the circumferential drum is out of phase by only one percent, then the system will be out of justification or registration with the print media by approximately 33 scan lines.

The photo receptors on the drum 40 are activated by an optical scanning assembly 41 that preferably scans a laser beam along the longitudinal direction of the drum for placing image information scan lines sequentially on the rotating drum to progressively construct the image. A toner developing device 42 is shown schematically downstream of the optical scanning system 41 for applying toner to the optical drum to form a toner image. The toner image is transferred to the print media 12 by an image transfer device 44. As the drum continues to rotate, it passes a charge elimination device 36 for electrically erasing the latent image that was previously formed. A drum cleaning device 47 is positioned downstream of the charge elimination electrode device 46 for removing any excess toner from the drum prior to the drum being recharged. A recharge electrode device 48 is positioned upstream of the optical scanning assembly 41 for recharging the photo receptors prior to each receptor being selectively activated by the optical scanning assembly 41.

After the latent toner image is placed on the moving print media 12 at the image transfer station, the print media is moved by the media moving means 28 past the image fixing station 32. A fuser roller assembly 50 is mounted at the image fixing station 32 for fixing the toner image rather permanently to the print media. The fuser roller assembly 50 also provides the precise drive velocity to move media 12 through print engine. In a preferred embodiment the fuser roller assembly 50 includes a heat roller 52 that has an heating element (not shown) for heating the roller to a preset temperature sufficient to fuse the toner to the print media. The assembly 50 includes a temperature sensor 54 for sensing the surface temperature of the heat roller 52. A pressure roller 56 forms a nip with the heat roller 52 for gripping and moving the print media 12 past the image fixing station. The heat roller 52 and the pressure roller 56 are rotated in opposite directions at the same constant peripheral speed to optimally move the print media 12 past the image transfer station and the image fixing station in total coincidence or synchronization with the rotation of the optical photo conductive drum 40.

The media moving means 28 includes a media feed and guide assembly 58 which is intermediate the image transfer station and the image fixing station 32 for initially feeding the beginning leader of the print media into the electrophotographic 10 and then guiding the print media during operation. The assembly 58 includes two tractors (FIG. 2) that are interconnected in which the tractors have parallel belts 52 with alignment pins 64 positioned thereon that correspond with the distance between the alignment apertures 17. The belts 62 are preferably continuous belts rotated on sprockets through interconnected shafts so that each belt moves in coordination with the other. The belts 62 provide a drag tension on the print media as the print media is being pulled through the fuser roller assembly to maintain the printer media taut as it passes the image fixing station 32.

The print media and guide assembly 58 include a media moving sensor 66 for sensing the amount of movement of the paper past the image transfer station and image fixing station. Preferably the sensor 66 is a rotary encoder that is operatively connected to a belt shaft for generating signals that accurately portray the amount of movement of the print media past the image transfer station 30 and image fixing station 32. In the preferred embodiment, the media moving sensor 66 generates at least one signal for each incremental movement of a print segment past the station section $B_1$-$B_n$. In the preferred embodiment, the sensor 66 generates a signal each time the print media is moved forward an increment of one-half inch so that absolute displacement and speed of print media may be accurately monitored. In effect, the sensor 66 provides a means for sensing the elapsed time for the print media to move the length of one print segment ($B_1$-$B_n$).

A system drive generally designated with the numeral 68 is operatively connected to the optical photographic drum 40, the fuser roller assembly 50 and the media feed and guide assembly 58 for rotating the drum and the fuser system in coordination with each other to preferably move the print media past the image transfer station at a coincident speed with the rotation of the drum for an accurate justification of the image on the print media. Generally the drive 68 is a single motor that is operatively connected to the units for operating the units in synchronization with each other. It is preferable to operate the tractors 58 at a rate of approximately one percent less than the rotational rate of the roller assembly 50 and the photo conductive drum 40 to place a tension on the print media. A one-way clutch is provided between the drive 68 and the belts 62 so that the belts 62 provide a slight resistance or drag. The clutch permits the belts to normally move at the same linear speed as circumferential speed of the drum 40 and rollers 52, 56. Because of the drag and changing fuser drive geometry due to heat, the linear velocity of the print media past the image transfer station may vary depending upon the width of the material, the thickness of the material or the composition of the material. As previously mentioned, when the print media is out of phase by one percent with respect to the peripheral speed of the drum 40, the print media can be out of phase approximately 33 scan lines in an eleven inch sheet or in twenty-two inch segments $B_1$-$B_{22}$.

As illustrated specifically in FIG. 2, the optical scanning assembly 41 preferably includes a laser 70 for directing a laser beam through a collimator lens 72 and then through a beam shaper 74 and then on to a polygonal scan mirror 76. The polygonal scan mirror 76 rotates at a constant speed to effectively scan the laser beam across the drum surface is a longitudinal direction to the drum axis that is transverse to the movement of the print media 12. A focus lens 78 focuses the beam from the polygonal scan mirror to a reflecting mirror 80 that directs the moving beam onto the drum surface. The assembly 41 further includes a scan sensor 82 for sensing the presence of a scan. The assembly 41 includes a polygonal scan mirror motor 84 that rotates the polygonal scan mirror 76 at a substantially constant rate which is synchronized with the rotation of the drum. In the preferred embodiment, the polygonal scan mirror 76 is rotated to provide 300 scan lines per circumferential inch of the drum or 150 scan lines per one-half inch of the drum circumference.

The printer 10 further includes a print control means generally designated with the numeral 86 that is shown in schematic block form in FIG. 3. Control means 86 includes a raster image processor 88 for processing information from an input device such as a computer that supplies image information to the printer 10. The raster image processor 88 formats the image information into individual image information scan lines for modulating the amplitude of the laser beam to selectively activate the photo conductors as the laser beam scans across the photo conductive drum for sequentially forming the image on the drum.

The control system 86 includes a printer control and justification processor generally designated with the numeral 90 for sequentially receiving the image information scan lines and controlling the formation of the image on the photo conductive drum and the application of the image to the print media 12. The processor 90 generally includes a CPU 92 that is synchronized by a clock 94. The CPU has read-only memory (ROM) 96 that is preprogrammed with instructions for operating the electrophotographic printer. Additionally, the processor 90 includes random access memory (RAM) 98 consisting of memory containing information necessary to implement the processor steps. The processor 90 includes the interrupt control 100 that is operatively connected to the media motion sensor 66 and the scan line sensor 82. When signals are provided to the interrupt control 100 the sequence of processing steps is interrupted to receive the sequence step processing of the information and perform the necessary calculations and implementations suggested by the interrupt. Additionally the processor 90 has input/output interface 102 that interfaces with a number of units. A bus control 104 is provided for controlling the information traffic on the bus between the various units of the processor.

The printer control system 86 further includes media drive circuit 106 that is operatively connected to the I/O interface 102 for controlling the drive 68. A fuser heater element activation circuit 108 is provided and connected to the I/O interface 102 for controlling the heating element in the fuser to maintain a desired fuser temperature. Additionally the control 86 includes a fuser temperature sensor circuit 110 for digitizing information from the temperature sensor 54.

Importantly the printer control 86 includes an all-white or blank scan line sensor circuit 112 that senses the occurrence of an all-white (blank) image information scan line. An all-white image information scan line is one in which all of the dots are white. Such all-white image information scan lines usually occur in textual material between character lines. Whether such all-white scan lines occur in a graphic mode is dependent upon the nature of the graphic image. The all-white scan line sensor 112 has a return line for providing information to the processor 90 when an all-white scan line occurs in a given segment ($B_1$-$B_n$). The sensor circuit 112 is mounted in the signal line passing to the laser for modulating the laser during each scan line.

The control 86 further includes optical scanning drive circuit 114 that is connected to the motor 84 for rotating the polygonal scan mirror 76 at a constant rotational speed to provide a constant scan rate.

In the operation of the electrophotographic printer 10, the media moving sensor 66 preferably generates a pulse or signal each time that the print media 12 has moved forward a distance of a segment ($B_1$-$B_n$). As previously mentioned each segment ($B_1$-$B_n$) is one-half inch in dimension along the direction of movement of the print media, if the movement of the print media 12 is in synchronization with the scanning, then 150 scan lines will be generated on the drum 40 during the elapsed time to move of each segment to place 150 scan lines of the image on the print media at the image transfer station. The scan sensor 82 provides interrupt information to the processor 90 each time that a scan line is generated on the photo conductive drum. The processor 90 is programmed to count each of the image information scan lines during the elapsed time that the print media 12 moves forward one-half inch. As mentioned, if the system is synchronized and in registration (justified), there will be 150 scan lines generated in each print segment ($B_1$-$B_n$). The print control and justification processor 90 monitors the number of scan lines generated during each time interval required for the print media to move forward one-half inch to determine if the print media is out of phase and to what extent. If the print media is moving too slow relative to the drum 40 or is moving too fast with respect to the photo conductive drum 40, it is out of phase. If the linear speed of the print media is slower than the peripheral movement of the drum 40 then more than 150 scan lines will be printed in each segment $B_1$-$B_{22}$. If the linear speed of the print media 12 is greater than the peripheral speed of the drum 40 then less 150 scan lines will be printed in each segment $B_1$-$B_{22}$. If no correction is made, the error has a cumulative effect.

For example, if 152 scan lines are placed in each segment, then an eleven inch sheet (twenty-two segments) will be out of phase by 44 dots. This error will be compounded as additional sheets of the continuous form passes through the printer.

To overcome this problem, the print control and justification processor 90 compares the actual number of scan lines, in this example 152, with the desired number of scan lines 150. This means that two scan lines that were supposed to be printed in the adjacent segment $B_2$ are in fact printed in the segment $B_1$. To overcome such an error, the processor 90 generates internal signals to duplicate two scan lines in segment $B_2$ so that although 152 scan lines are placed in segment $B_2$, two of the 152 scan lines are duplicate image information scan lines of the scan lines for $B_2$. Segment $B_2$ will contain 150 original scan lines and two duplicate scan lines. The duplicated scan lines may be placed adjacent their original scan lines. Although such a procedure may increase the size of print characters, etc., such increase in size is essentially imperceptible to the eye and prevents accumulation of the justification error.

If the number of image information scan lines in $B_1$ is 151 scan lines, then only one image information scan line will be duplicated in $B_2$. If 153 scan lines are positioned in segment $B_1$, then three scan lines will be duplicated in $B_2$ so that $B_2$ will contain 150 original image information scan lines and three duplicates. In this way, the processor adds duplicate scan lines equal to the number of the difference between the actual scan lines and the desired scan lines (150 lines per one-half inch).

If the print media 12 is moving at a linear speed faster than the peripheral speed of the photo conductive drum 40, then less than 150 scan lines will be printed in a print segment ($B_1$-$B_n$). In this case, the processor will delete image information scan lines based upon the difference between the actual number of scan lines and the desired number of scan lines.

In addition to the duplication or deletion of scan lines, it is preferable to add or subtract scan lines that are all-white, i.e. containing no dark dot. Such all-white scan lines normally occur in textual material between character print lines. The printer control system 86 includes the white scan line sensor 112 that continuously monitors each of the image information scan lines and determines the presence of an all-white image information scan line and provides such information to the processor 90 so that should the linear speed of the print media 12 be out of phase with the peripheral speed of the drum 40, the processor can add duplicate lines or delete lines that are all-white. If no white lines are found, then the processor may select a predetermined line within the print segment to duplicate or predetermined line to delete. Alternately, the processor may be programmed to seek random locations for the scan lines to be duplicated or deleted so that the duplication or deletion will not occur at the same location within each segment ($B_1$-$B_n$).

It should be noted that if the linear speed of the print media is slower than the circumferential speed of the drum 40 then all except the first segment $B_1$ will contain 150 original image information scan lines and a number of duplicate lines depending upon the number of detected of the actual lines greater than the desired scan lines.

Each duplicated scan line may be placed adjacent to its original scan line. If two or more duplicate lines are required, they are placed in succeeding adjacent positions to their original image information scan line. As previously mentioned, although such a procedure provides for a slight distortion of the image, such distortion is substantially visually imperceptible. Furthermore such a procedure provides a rather accurate and real time correction to the out of phase problem so that the error is not compounded from one print segment to an adjacent segment and is most importantly not compounded from one sheet 14 to a subsequent sheet 14.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An electrophotographic printer for printing an image onto a plurality of print segments of known lengths of a moving print media in which the image is justified relative to the print media in the direction of media movement, comprising:

print media moving means for moving the print media initially past an image transfer station and then past an image fixing station;

an image formation and transfer device at the image transfer station having a photo-conductive surface for receiving a latent image and transferring the latent image to the moving print media as the media moves past the image transfer station;

an image fixing device at the image fixing station for fixing the latent image to the moving media as the media is moved past the image fixing station;

media movement detecting device for detecting an elapsed time required to move the media forward the length of a print segment relative to the image transfer station and the image fixing station;

an illumination scan device at the image transfer station for repetitively scanning the photo-conductive surface to form the latent image composed of multiple adjacent scan lines with each scan line containing image information;

counting means for determining the actual number of scan lines formed on the photo-conductive surface during the elapsed time required to move the media the preselected segment lengths;

justification means operatively connected to the counting means for comparing the actual number of scan lines formed on the photo-conductive surface during the elapsed time with a desired number of scan lines and for duplicating one or more of the image information scan lines when the number of actual scan lines exceeds the desired number of scan lines.

2. The electrophotographic printer as defined in claim 1 wherein the justification means duplicates an adjacent image information scan line.

3. The electrophotographic printer as defined in claim 1 wherein the justification means duplicates one or more of the image information scan lines in a succeeding print segment based upon the scan line comparison of a preceding segment.

4. The electrophotographic printer as defined in claim 3 wherein the justification means duplicates a number of scan lines equal to the difference between the actual number of scan lines and the desired number of scan lines.

5. The electrophotographic printer as defined in claim 1 wherein the justification means additionally deletes image information scan lines when the desired number of scan lines exceeds the actual number of actual scan lines.

6. The electrophotographic printer as defined in claim 1 wherein the justification means includes a content scan line detection circuit for detecting the occurrence of an all-white image information scan line in a print segment and wherein the justification means duplicates the all-white image information scan line adjacent the detected all-white image information scan line.

7. The electrophotographic printer as defined in claim 1 wherein the justification means duplicates a number of scan lines equal to the difference between the actual number of scan lines and the desired number of scan lines.

8. An electrophotographic printer for printing an image onto a plurality of print segments of known lengths of a moving print media in which the image is justified relative to the print media in the direction of media movement, comprising:

print media moving means for moving the print media initially past an image transfer station and then past an image fixing station;

an image formation and transfer device at the image transfer station having a photo-conductive surface for receiving a latent image and transferring the latent image to the moving print media as the media moves past the image transfer station;

an image fixing device at the image fixing station for fixing the latent image to the moving media as the media is moved past the image fixing station;

media movement detecting device for detecting an elapsed time required to move the media forward the length of a print segment relative to the image transfer station and the image fixing station;

an illumination scan device at the image transfer station for repetitively scanning the photo-conductive surface to form the latent image composed of multiple adjacent scan lines with each scan line containing image information;

counting means for determining the actual number of scan lines formed on the photo-conductive surface during the elapsed time required to move the media the preselected segment;

justification means operatively connected to the counting means for comparing the actual number of scan lines formed on the photo-conductive surface during the elapsed time with a desired number of scan lines and (1) for duplicating one or more of the image information scan lines when the number of actual scan lines exceeds the desired number of scan lines and (2) for deleting one or more scan lines when the desired number of scan lines exceeds the actual number of scan lines.

9. An electrophotographic printer for printing an image onto a plurality of adjacent print segments of a known length of a moving print media in which the image is justified relative to the print media in the direction of media movement when the desired number of scan lines is exceeded for each print segment, comprising:

print media moving means for moving the print media initially past an image transfer station and then past an image fixing station;

a image receiving and transfer device at the image transfer station having a photo-conductive surface for receiving a latent image and transferring the latent image to the moving print media as the media moves past the image transfer station;

an image fixing device at the image fixing station for fixing the transferred latent image to the moving media as the media is moved past the image fixing station;

media movement detecting device for detecting an elapsed time required to move the media a preselected incremental distance relative to the image transfer station and the image fixing station;

an illumination scan device at the image transfer station for repetitively scanning the photo-conductive surface to form a latent image of multiple adjacent scan lines on the photo-conductive surface with each scan line containing image information;

counting means for determining the number of scan lines formed on the photo-conductive surface during the elapsed time required to move the media the preselected incremental distance;

justification means operatively connected to the counting means for comparing the actual number of scan lines formed on the photo-conductive surface during the elapsed time with a desired number of scan lines and for duplicating a number of scan lines equal to the difference between the number of actual scan lines and the desired number of scan lines.

* * * * *